(12) United States Patent
Plüss et al.

(10) Patent No.: US 12,153,719 B2
(45) Date of Patent: *Nov. 26, 2024

(54) ELECTRONIC DEVICE

(71) Applicant: LEGIC Identsystems AG, Wetzikon (CH)

(72) Inventors: Marcel Plüss, Tann (CH); Peter Rabold, Wangen (CH); Michael Würth, Winterthur (CH)

(73) Assignee: LEGIC Identsystems AG, Wetzikon (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/582,931

(22) Filed: Feb. 21, 2024

(65) Prior Publication Data

US 2024/0232440 A1    Jul. 11, 2024

Related U.S. Application Data

(63) Continuation of application No. 17/308,602, filed on May 5, 2021, now Pat. No. 11,941,158.

(30) Foreign Application Priority Data

May 5, 2020    (CH) .......................... 531/20

(51) Int. Cl.
*G06F 21/71*    (2013.01)
*G06F 9/54*    (2006.01)
(Continued)

(52) U.S. Cl.
CPC .............. *G06F 21/71* (2013.01); *G06F 9/541* (2013.01); *G06F 21/572* (2013.01); *G06F 21/78* (2013.01);
(Continued)

(58) Field of Classification Search
CPC ........... H04L 9/08; H04L 9/0894; G06F 11/64
See application file for complete search history.

(56) References Cited

U.S. PATENT DOCUMENTS 8,676,161 B2    3/2014 Phillips et al.
10,783,269 B1*   9/2020 Shraer ................ H04L 67/1097
(Continued)

OTHER PUBLICATIONS

Jul. 23, 2020—(CH) Search Report—App 5312020.

*Primary Examiner* — Shaqueal D Wade-Wright
(74) *Attorney, Agent, or Firm* — Banner & Witcoff, Ltd.

(57) ABSTRACT

A electronic device including an integrated circuit, the integrated circuit comprising a secure element electronic circuit and an electronic radio communication circuit, the secure element electronic circuit having stored therein firmware program code configured to implement operating system functions, the operating system functions including a data receiving function and a data transmitting function, wherein the firmware program code is further configured to control the secure element electronic circuit to determine in the received data custom program code for a custom application, and to store the custom program code in the memory of the secure element electronic circuit, and to implement an application programming interface configured to receive from the custom application requests for called operating system functions, and to execute the called operating system functions for the custom application.

20 Claims, 3 Drawing Sheets

(51) Int. Cl.
*G06F 21/57* (2013.01)
*G06F 21/78* (2013.01)
*H04L 9/08* (2006.01)
*H04L 9/40* (2022.01)
*G06F 7/58* (2006.01)
*G06F 11/10* (2006.01)
*H04W 12/30* (2021.01)

(52) U.S. Cl.
CPC ............ *H04L 9/0894* (2013.01); *H04L 63/12* (2013.01); *G06F 7/58* (2013.01); *G06F 11/1004* (2013.01); *H04W 12/35* (2021.01)

(56) References Cited

U.S. PATENT DOCUMENTS

| | | |
|---|---|---|
| 2011/0145810 A1 | 6/2011 | Forsyth |
| 2014/0331279 A1 | 11/2014 | Aissi et al. |
| 2016/0054989 A1 | 2/2016 | Diebolt et al. |
| 2016/0299832 A1 | 10/2016 | Bogusz et al. |
| 2017/0078269 A1 | 3/2017 | Han et al. |
| 2018/0225459 A1 | 8/2018 | Zarakas et al. |
| 2019/0095907 A1 | 3/2019 | Govindarajan et al. |
| 2019/0357044 A1 | 11/2019 | Park |
| 2020/0177385 A1 | 6/2020 | Kumar et al. |
| 2020/0235929 A1 | 7/2020 | Jacobs et al. |
| 2022/0245253 A1* | 8/2022 | Van Nieuwenhuyze .................... G06F 21/575 |

* cited by examiner

ELECTRONIC DEVICE

CROSS-REFERENCE TO RELATED APPLICATIONS

This application is a continuation of U.S. application Ser. No. 17/308,602, filed May 5, 2021, which claims priority to and the benefit of Switzerland Patent Application 00531/20 filed May 5, 2020, the contents of which are incorporated by reference in their entireties herein.

FIELD OF DISCLOSURE

The present disclosure relates to an electronic device. In particular, the present disclosure relates to an electronic device, which includes an integrated circuit with an electronic radio communication circuit and a secure element electronic circuit.

BACKGROUND OF THE DISCLOSURE

Electronic devices are commonplace in all areas of industry and commerce, and in many cases comprise integrated circuits (ICs), which are small semiconductor devices, which feature a range of circuits, such as processors, which execute program code, and processors, which are specially configured for performing particular tasks. Other kinds of semiconductor devices include application specific integrated circuits (ASICs), for example.

In applications where secure execution is required, electronic devices typically feature a secure element, which is used to store sensitive data and run secure applications. These secure elements are typically printed onto the same circuit board as the rest of the ICs of the electronic device. Secure elements are used, for example, to store cryptographic keys such that the rest of the electronic device has no knowledge of, and cannot gain access to, the cryptographic keys. This is to ensure that any malware, which may be executed on the electronic device, cannot discover or manipulate the cryptographic keys. The cryptographic keys are typically stored in the secure element during manufacture and cannot be altered. Along with simply storing cryptographic keys, these secure elements often provide some additional limited functionality related to cryptography and security, often realized as application specific circuitry. These additional functions include cryptographic functions, functions for detecting tampering of the secure element or the host device, functions for detecting side channel attacks, and so on. This small set of additional functions enables the secure element to, in a limited manner, authenticate credentials, for example, and provide and verify digital signatures.

In the electronic device, the secure element is typically used in conjunction with a general purpose processor. The general purpose processor executes custom program code, often also executing custom program code from a third party, and when use of the secure element is required, messages are sent to and received from the secure element, typically using a system bus.

A wide range of applications requires secure execution of code and therefore typically employs the use of a secure element. Authenticating access of a third party device or a user in access control systems require secure execution of code. Such access control systems govern access to physical locations, vehicles, or resources, for example, or govern access to virtual systems, such as websites, computing environments or servers. Further application areas where secure elements are used are telecommunications in general, specifically systems for processing electronic payments, systems for digitally signing documents, messages, or data, and systems which register items, goods, or shipments, or monitor these during transit. In general, it may be said that where a known electronic device interacts with an unknown or unsecured device, or a known electronic device is reprogrammable and is configured to run program code from a third party, use of a secure element is often used to increase security.

SUMMARY OF THE DISCLOSURE

This disclosure provides an electronic device, which electronic device does not have at least some of the disadvantages of the prior art. In particular, the present disclosure provides an electronic device comprising a secure element.

According to the present disclosure, numerous advantageous embodiments are achieved through the features of the independent claims. In addition, further advantageous embodiments follow from the dependent claims and the description.

According to the present disclosure, an electronic device includes an integrated circuit. The integrated circuit comprises at least one electronic radio communication circuit and a secure element electronic circuit. The secure element electronic circuit is an electronic circuit configured to implement a secure element. The secure element electronic circuit includes a processor and memory, the processor of the secure element being connected to the electronic radio communication circuit and to the memory of the secure element. By having the secure element and the electronic radio communication circuit in the same integrated circuit, security of the integrated circuit is enhanced by reducing the exposure to side channel attacks, as well as lowering material use in manufacture and achieving space and energy savings through a more thoroughly integrated circuit. The memory of the secure element has stored therein firmware program code configured to control the processor of the secure element to implement operating system functions. The operating system functions are a set of functions, which the secure element uses to manage resources, such as the processor and the memory and to execute and provide functionality to the integrated circuit. The operating system functions include a data receiving function that obtain received data from the electronic radio communication circuit, and a data transmitting function that writes data to be transmitted to the electronic radio communication circuit. The firmware program code is further configured to control the processor of the secure element to determine in the received data custom program code for a custom application, and to store the custom program code in the memory of the secure element. The firmware program code is further configured to control the processor to implement an application programming interface configured to receive from the custom application, upon execution of the custom program code on the processor of the secure element, requests for operating system functions, and to execute the called operating system functions for the custom application. The firmware program code comprises program code installed in and included with the integrated circuit, in particular the secure element, during manufacture or commissioning. The custom program code, on the other hand, is program code, which is not included, installed, or provided with the integrated circuit, in particular the secure element, during manufacture or provisioning. The custom program code rather, is received after the electronic device has been manufactured and commissioned and is stored entirely separate from the firmware program code.

In an embodiment, the electronic device is a reader device. In particular, the reader device is installed in, on, or next to a gate, door, entryway, or similar access point to an access control location. The reader device is used for controlling access of persons, vehicles, and/or goods. Specifically, the reader device receives credentials from a user, a portable user device, tag, dongle, or the like. The credentials are received in the reader device via the electronic radio communication circuit or a user interface of the electronic device, and used by the secure element, in particular the processor of the secure element, to determine access authorization for the person, vehicle, or good.

In an embodiment, the electronic device is a terminal device. In particular, the terminal device for processing electronic payments or orders.

In an embodiment, the firmware program code is further configured to control the processor of the secure element to determine in the received data encrypted custom program code for the custom application, and to decrypt the encrypted custom program code, prior to storing the custom program code in the memory of the secure element, using a cryptographic key stored in the memory of the secure element.

In an embodiment, the firmware program code is further configured to control the processor of the secure element to determine in the received data an encrypted data container, to determine a data container content by decrypting the encrypted data container, using a cryptographic key stored in the memory of the secure element, and to store at least some data of the data container content in the memory of the secure element.

In an embodiment, the firmware program code is further configured to determine the custom program code for the custom application in the data container content, prior to storing the custom program code in the memory of the secure element.

In an embodiment, the firmware program code is further configured to determine in the data container content different modules of the custom program code, each module being associated with a custom code type identifier, and to store the different modules of the custom program code in different memories, depending on the custom code type identifier. The different memories include a memory section of the memory of the secure element, a memory section of the electronic radio communication circuit, and/or a memory of an external processor, separate from the integrated circuit.

In an embodiment, the memory sections of the memory of the secure element are strictly separate from one another, and this separation is achieved by, for example, assigning each memory section to a unique memory address space. A memory management unit in the secure element is configured to maintain and assign memory address spaces for different processes being executed in the processor. The memory management unit ensures that the custom program code and the firmware code do not share the same memory address space and that processes do not have access to memory addresses not belonging to the memory address space assigned to that process. This increases the security of running custom program code on the processor of the secure element.

In an embodiment, the firmware program code is further configured to determine in the data container content a custom cryptographic key, and to store the custom cryptographic key in the memory of the secure element as a replacement of the cryptographic key stored previously in the memory of the secure element.

In an embodiment, the firmware program code is further configured to control the processor of the secure element to verify in the custom program code a version indicator, a manufacturer identifier, and/or a cryptographic signature, prior to storing the custom program code in the memory of the secure element.

In an embodiment, the firmware program code is further configured to control the processor of the secure element to implement operating system functions further including one or more cryptographic functions, the one or more cryptographic functions comprising an encryption function, a decryption function, a hash function, a cryptographic key generating function, a cryptographic key deletion function, a cryptographic signing function, and/or a cryptographic signature verification function.

In an embodiment, the firmware program code is further configured to control the processor of the secure element to implement operating system functions further including a random generator function. The random generator function is a true random number generator, which generates random numbers from a physical process, rather than pseudo random numbers generated by means of an algorithm. The random generator function uses a hardware-based random generator of the secure element. For example, the hardware-based random generator amplifies random thermal noise and then converts the random thermal noise, using an analog-to-digital converter, to generate a random string of digital bits.

In an embodiment, the firmware program code is further configured to control the processor of the secure element to implement operating system functions further including one or more error checking functions, for example a cyclic redundancy check function. Additionally, error correcting functions are also included, depending on the embodiment.

In an embodiment, the firmware program code is further configured to control the processor of the secure element to determine in the received data custom application data for the custom application, and to store the custom application data in the memory of the secure element, the custom application data comprising a cryptographic key, a cryptographic certificate, an access control black list, and/or an access control white list for the custom application. Specifically, the access control black list or the access control white list is used for access control, the access control black list comprising identifiers corresponding to devices or persons which are not granted access authorization, and the access control white list comprising identifiers corresponding to devices or persons which are granted access authorization.

In an embodiment, the firmware program code is further configured to control the processor to implement the application programming interface further configured to receive from the custom application, upon execution of the custom program code on the processor of the secure element, a function input parameter with a request for an operating system function, and to return to the custom application a function output parameter, upon execution of the called operating system function.

In an embodiment, the electronic radio communication circuit comprises a processor and memory, and wherein the firmware program code is further configured to control the processor of the secure element to determine in the received data further program code for the electronic radio communication circuit, and to store the further program code in the memory of the electronic radio communication circuit.

In an embodiment, the firmware program code is further configured to control the processor of the secure element to determine in the received data further program code for an external processor, separate from the integrated circuit, and to transfer the further program code to the external processor.

In an embodiment, the firmware program code is further configured to control the processor of the secure element to transfer the further program code to the external processor via conductor paths of a printed circuit board, a wire connection of an electronic interface circuit, and/or an antenna of an electronic radio communication circuit.

In an embodiment, the electronic device further comprises an electronic communication circuit having an electronic interface circuit configured to exchange data with an external device via a wire connection. For example, an external device is plugged into the electronic device using a plug in the electronic device connected to the electronic interface circuit.

In an embodiment, the secure element further comprises a memory management unit configured to maintain a plurality of memory address spaces in the memory, and to assign to the custom application and the firmware program code separate memory address spaces. The memory management unit is configured such that the custom application code does not have access to the memory address space of the firmware program code. This increases the security of the secure element, as the memory management unit ensures that the custom application or its custom program code, respectively, cannot gain unauthorized access to the memory address space of the firmware program code. The custom application therefore cannot access or manipulate data internal to the firmware program code and can access firmware program code functionality only via the application programming interface of the firmware program code.

BRIEF DESCRIPTION OF THE DRAWINGS

The present disclosure will be explained in more detail, by way of example, with reference to the drawings in which.

DETAILED DESCRIPTION

Figure 1:
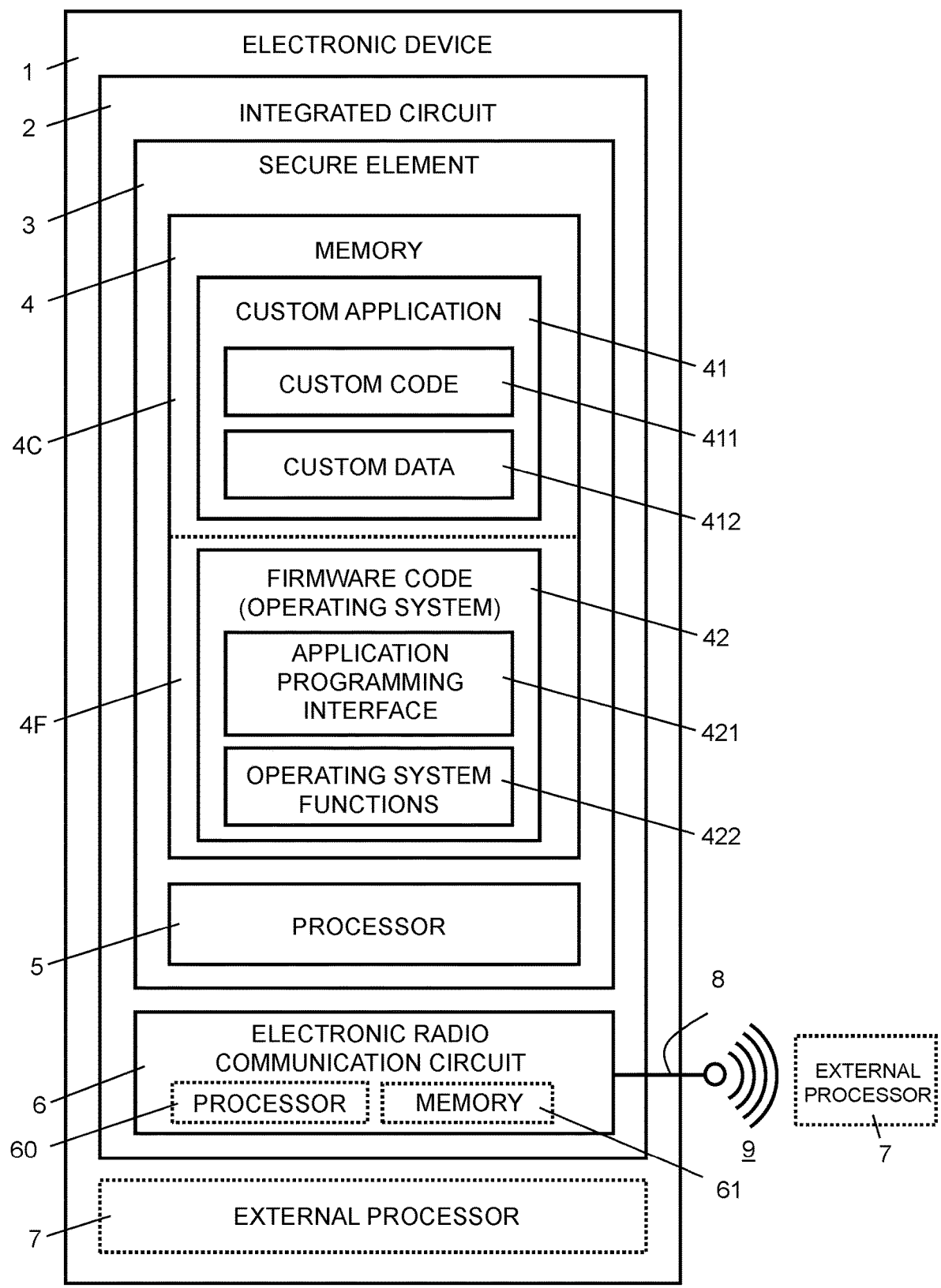
FIG. 1 shows a block diagram illustrating schematically an electronic device according to an embodiment of the disclosure.

FIG. 1 shows a block diagram illustrating schematically an electronic device 1. The electronic device 1 includes an integrated circuit 2. The integrated circuit 2 comprises a secure element 3 and an electronic communication circuit 6. Depending on the embodiment, the electronic communication circuit 6 comprises an electronic radio communication circuit and/or an electronic communication circuit configured for communication via a wired connection, described below in more detail. The secure element 3 refers to specific electronic circuitry in the integrated circuit 2 for securely executing specific computer program code, and as such comprises a memory 4 for storing the code, and a processor 5 for executing the code. The person skilled in the art understands that the secure element 3, which comprises the memory 4 and the processor 5, differs from a typical integrated circuit comprising a memory and a processor in a number of ways. Generally speaking, the secure element 3 is configured to store particularly sensitive data and run applications securely. Depending on the embodiment, the secure element 3 is configured for tamper resistance or configured to detect tampering, configured to be a root of trust in that it establishes an authentication chain using cryptographic keys stored securely in the memory 4, configured to provide cryptographically secure random number generation, configured to provide cryptographic services (e.g. AES decrypting using a secret key stored in the memory 4, generating a signature of a message using a private key stored in the memory 4, and verifying a signature), configured for secure generation of keys (e.g. generation of a public key pair or of a shared-secret key for authentication), and/or configured to securely monitor further components of the integrated circuit 2 or electronic device 1, such as a hardware or software configuration. The person skilled in the art understands that not all of the previously listed features or services must be present in a secure element circuit 3 according to the present disclosure and that at the same time, mere possession of some of these features or services does not qualify a common processor and memory as being a secure element 3 according to the present disclosure.

The processor 5 of the secure element 3 comprises a central processing unit (CPU) for executing computer program code stored in the memory 4. The processor 5 also includes more specific processing units such as application specific integrated circuits (ASICs), reprogrammable processing units such as field programmable gate arrays (FPGAs), or processing units specifically configured to accelerate certain applications, such as cryptographic accelerators for accelerating cryptographic functions.

The memory 4 of the secure element 3 comprises one or more volatile (transitory) and or non-volatile (non-transitory) storage components. The storage components are non-removable and integrated into the secure element 3. Examples of storage components include RAM (Random Access Memory), flash memory, data memory, and/or other data stores. In an embodiment, the memory 4 is encrypted and protected from unauthorized access. The memory 4 is divided into two or more sections. Each section has a unique memory address space 4C, 4F, which is managed by a memory management unit. The memory management unit is located in the secure element 3 and, in an example, is part of the memory 4. The memory management unit is configured to manage memory address spaces 4C, 4F for the processes being executed on the processor 5. Specifically, the memory management unit is configured to ensure that a particular process being executed on the processor 5 only has read/write access to the memory address space 4C, 4F assigned to that particular process. Additionally, depending on the process, the memory management unit grants access to other memory address spaces 4C, 4F. In FIG. 1, reference numeral 4C refers to the memory address space of the custom application 41 with custom program code 411 and custom data 412; whereas reference numeral 4F refers to the memory address space of the firmware program code 42.

The memory 4 has stored thereon firmware program code 42 and custom program code 411 configured to control the processor 5 of the secure element 3, such that the secure element 3 performs one or more steps and/or functions as described herein. Depending on the embodiment, the firmware program code 42 and/or custom program code 411 is compiled or non-compiled program logic and/or machine code. The firmware program code 42 is configured to implement the operating system of the secure element 3. The custom program code 411 is part of a separate and discrete custom application 41. One skilled in the art will understand, that the custom program code 411 can also be distributed across a plurality of software applications. The custom application 41 is installed in the secure element 3. The firmware program code 42, beyond core operating system functions 422 further provides an application programming interface 421, such that functionality and/or data of the secure element 3 can be accessed by other hardware modules of the electronic device 1, such as the electronic (radio) communication circuit 6 or further integrated circuits of the electronic device 1. As explained above in more detail, while at least some of the firmware program code 42 is installed in the memory 4 during manufacture or commissioning of the integrated circuit or the secure element 3, the custom application 41 is not. Rather the custom application 41 is stored in the memory 4 after manufacturing and commissioning of the integrated circuit 2 or the secure element 3. Further, while at least parts of the firmware program code 42, in particular at least some of the operating system functions 422, e.g. a basic device boot function for loading further (firmware and/or custom) program code 411, are fixedly installed in the memory 4 of the secure element 3, further firmware program code 42 and the custom program code 411 of the custom application 41 can be exchanged or updated as explained below in more detail. This enables the electronic device 1, and in particular the secure element 3, to be implemented in a flexible manner and be easily configured and reconfigured depending on technical requirements. In particular, some of the firmware program code 42 and the custom program code 411 of the custom application 41 can be updated to improve security, implement new technology, extend functionality, and achieve compatibility with new types of electronic devices 1. As explained above, the memory management unit manages memory address spaces 4C, 4F for each process. In particular, the memory management unit is configured to ensure that the custom application 41 (and its custom program code 411) does not have access to the memory address space 4F of the firmware program code 42.

In an embodiment, the memory 4 of the secure element 3 has more than 16 kilobytes (kB) of memory, preferably more than 32 kB, more preferably more than 64 kB of memory. The larger memory size allows the memory 4 to store more complex custom program code 411 with more functionality.

In an embodiment, the memory 4 comprises a buffer. The buffer is a temporary data store in the memory 4, which stores data obtained by the secure element 3 or the electronic (radio) communication circuit 6, respectively.

The memory 4 stores, in general, both computer program code and data. The memory 4 is partitioned into two or more parts, either by physically provisioning the memory 4 as two or more separate hardware modules, or by logically partitioning the memory 4 into two or more logical partitions. One of the parts of the memory stores the custom application 41. The custom application 41 comprises both custom program code 411, which is configured to control the processor 5 to execute a series of steps and/or functions, and custom data 412, which stores data of the custom application 41.

Another part of the memory 4 stores the firmware program code 42. The firmware program code 42 is configured to implement an operating system, which operating system includes the application programming interface (API) 421 and operating system functions 422. The operating system functions 422 comprise a data receiving function in which the processor 5 of the secure element 3 receives data via the electronic (radio) communication circuit 6, and a data transmitting function, in which the processor 5 receives data via the electronic (radio) communication circuit 6.

In an embodiment, the firmware program code 42 initially installed and stored in a fixed fashion in the memory 4 of the secure element 3, during manufacture or commissioning of the electronic device 1, includes and/or is limited to a basic device boot function for loading and storing securely further firmware program code and/or custom program code into the memory 4 of the secure element 3. Depending on the configuration and/or scenario, the further firmware program code and/or custom program code are loaded in one common data file or in separate data files, e.g. in an encrypted data container comprising further firmware program code, in an encrypted data container comprising custom program code, and/or in an encrypted data container comprising further firmware program code and custom program code. The custom program code 411 is defined by and can be determined by the firmware program code 42, e.g. by the basic device boot function, based on a custom code identifier. The custom code identifier is linked to the custom program code 411, e.g. included in the encrypted data container and/or as an integral part of the custom program code 411.

The custom program code 411 is configured to control the processor 5 to retrieve data from the custom data 412, process the retrieved data according to the instructions of the custom program code 411, and save the processed data to the custom data 412. In particular, the custom program code 411 is configured to call operating system functions 422 of the firmware program code 42 using the application programming interface 421, as is explained below in more detail in the description of FIG. 3. The custom program code 411 is also configured to control the processor 5 to receive data from the electronic (radio) communication circuit 6 and to transmit data to the electronic (radio) communication circuit 6.

The operating system functions 422, e.g. as part of the basic device boot function, further comprise functions to decrypt parts of the received data which are encrypted, for example encrypted firmware program code, custom program code or an encrypted data container with firmware program code, device data, custom program code, and/or custom application data. The processor 5 uses one or more cryptographic keys stored in the memory 4 of the secure element 3 to decrypt the received data. The cryptographic keys are stored in the memory 4 during manufacture or commissioning of the electronic device 1. The cryptographic keys can also be replaced or updated after commissioning as explained below in more detail. The operation system functions 422 further comprise functions related to determining the contents of decrypted data, depending on the type of data that was decrypted. For example, the operating system functions 422 comprise functions to determine a data container content in the decrypted data container and to store at least some data of the data container content in the memory 4 of the secure element 3.

In an embodiment, the firmware program code 42 further includes one or more cryptographic functions, the one or more cryptographic functions comprising an encryption function, a decryption function, a hash function, a cryptographic key generating function, a cryptographic key deletion function, a cryptographic signing function, and/or a cryptographic signature verification function. In an embodiment, one or more of these functions is implemented as an ASIC in the secure element 3 in order to increase the speed of the secure element 3.

In an embodiment, the firmware program code 42 is further configured to control the processor 5 of the secure element 3 to implement an error checking function. The error checking function checks whether data received in the secure element 3 was received without error and increases the reliability of the received data. In particular, the firmware program code 42 is configured to implement a cyclic redundancy check function. Other error checking functions such as a function to check parity bits, checksum functions, cryptographic hash functions, are also implemented, depending on the embodiment. Further, in a variation, the firmware program code 42 is configured to control the processor 5 of the secure element 3 to implement an error correction function.

In an embodiment, the operating system functions 422 further comprise a random generator function. The random generator function is configured to control the processor 5 to generate random or pseudo-random bits.

In an embodiment, the secure element 3 of the integrated circuit 2 further includes a hardware-based random generator. The hardware-based random generator amplifies random thermal noise to generate, using an analog-to-digital converter, a random string of digital bits. The secure element 3, in particular the operating system functions 422, comprise cryptographic functions, which use the random string of digital bits. These cryptographic functions can also be implemented as application specific circuits of the secure element 3.

In an embodiment, the electronic device 1 further includes, or is communicatively coupled to one or more additional processors. These additional processors can either be internal, and therefore integrated into the electronic device 1, or external to the electronic device 1. The electronic (radio) communication circuit 6 optionally includes a processor 60 and memory 61. The electronic device 1 optionally includes an external processor 7. Further, the external processor 7 is, in an embodiment, separate from the electronic device 1, however remains communicatively coupled to the electronic device 1 via a wired connection or via a wireless connection with radio signals 9. The wired connection is via a cable or a bus, for example using a UART (Universal Asynchronous Receiver/Transmitter) circuit, or using an SPI (Serial Peripheral Interface) communication interface specification. The electronic radio communication circuit 6 has an antenna 8 for enabling the transmission and reception of radio signals 9. Depending on the embodiment, the electronic radio communication circuit 6 is configured for wireless communication using RFID (Radio Frequency Identification), more specifically NFC (Near Field Communication), Bluetooth, Bluetooth Low Energy, and/or Ultrawideband (UWB).

In a preferred variation, the electronic radio communication circuit 6 is directly connected to the antenna 8. Specifically, the electronic radio communication circuit 6 is in direct electrical contact with the antenna 8, without any intervening circuit elements such as diodes, capacitors, inductors, etc. placed between the electronic radio communication circuit 6 and the antenna 8. All filtering and signal processing takes place in the electronic radio communication circuit 6. This allows the electronic device 1 to be manufactured in a smaller space with fewer circuit elements.

Figure 2:
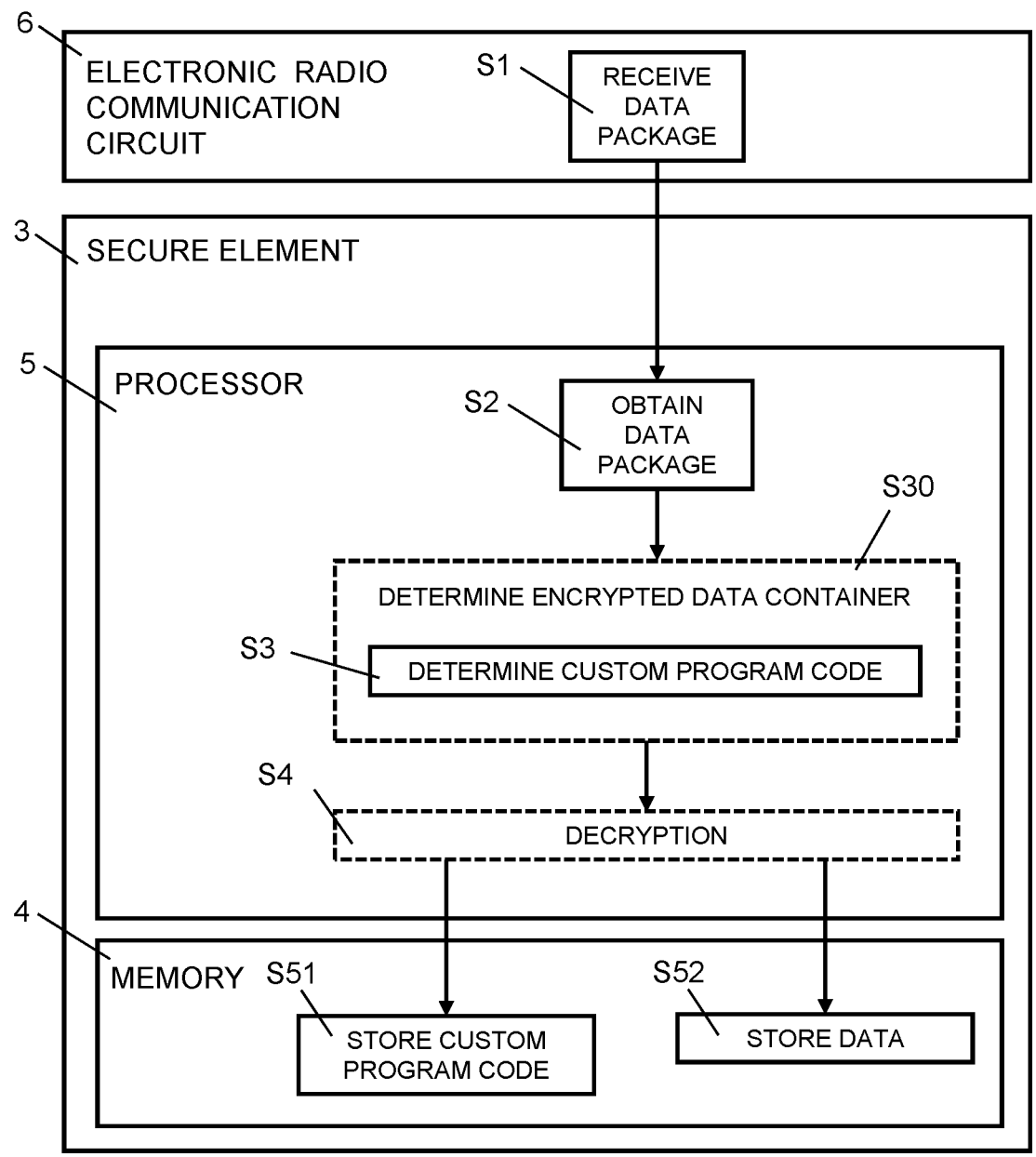
FIG. 2 shows a flow diagram illustrating an exemplary sequence of steps for receiving data in the electronic device.

FIG. 2 shows a flow diagram illustrating an exemplary sequence of steps for receiving data in the electronic device 1. In step S1, the electronic (radio) communication circuit 6 receives a data package. In the embodiment where the electronic communication circuit 6 is an electronic radio communication circuit, the data package is received from the antenna 8, which picks up radio signals 9 of an electronic device 1. In the embodiment where the electronic communication circuit 6 comprises an electronic interface circuit, the data package is received via a wire connection. The firmware program code 42, e.g. the basic device boot function, is configured to control the processor 5 of the secure element 3 to receive, in step S2, the data package from the electronic (radio) communication circuit 6. The processor 5 then determines the contents of the data package according to the firmware program code 42. If the data package is determined to include custom (and/or firmware) program code in step S3, the processor 5 stores the custom (and/or firmware) program code in the memory 4 in step S51. Likewise, if the processor 5 determines that the data package includes an encrypted data container in step S30, the processor 5 then stores at least some of that data in the memory 4 in step S52, e.g. firmware program code 42, device data, custom program code 411, and/or custom application data 412. If the custom (and/or firmware) program code 411 or the data container are encrypted, then in optional step S4 the processor 5 decrypts the custom (and/or firmware) program code 411 or the data container prior to storing the custom (and/or firmware) program code 411 or the data in the memory 4, respectively. The processor 5 uses a cryptographic key stored in the memory 4 for this decryption.

In an embodiment, the data package is received by the electronic (radio) communication circuit 6 in step S1 in a number of pieces. The secure element 3 is configured to store in the memory 4, in particular the buffer of the memory 4, the pieces as they are received. Once all the pieces of the data package have been received and the data package is complete, the processor 5 proceeds to step S2.

In an embodiment, the custom program code 411, which was contained in the received data package, is stored in the memory 4 only once one or more of a number of conditions is met. These conditions include a device reset, in which the electronic device 1 is reset to a default state, a device reboot, in which the electronic device 1 is powered off and powered on again, an operating system restart, in which the firmware program code 42 is restarted, and a time-unlock, in which the custom program code 411 is stored in the memory 4 only once a particular point in time has arrived. The time-unlock in particular allows a plurality of electronic devices 1 to receive custom program code 411 at different points in time, yet store them in memory 4 only at the pre-determined point in time of the time-unlock. The time-unlock is, in an example, transmitted as part of the data package. In the above passages, a distinction has been made between the processor 5 obtaining the data package and the contents of that data package being stored in the memory 4. It is clear to the person skilled in the art that the data package is already temporarily stored, for example in a cache section of the memory, as soon as the data package has been transmitted from the electronic (radio) communication circuit 6 to the secure element 3. However, what is meant by storing in the memory 4 is a storage in a section of the memory 4 such that the custom program code 411 may be executed by the processor 5.

In an embodiment, the firmware program code 42, e.g. the basic device boot function, is further configured to control the processor 5 of the secure element 3 to verify in the custom (and/or firmware) program code 411 the version indicator, the manufacturer identifier, and/or the cryptographic signature, prior to storing the custom (and/or firmware) program code 411 in the memory 4 of the secure element 3. This ensures that only secure and trusted custom (and/or firmware) program code 411 is stored in the memory 4. The trusted program code 411 is verified using either one or more cryptographic keys stored in the memory 4 of the secure element 3, or verified using a data message from a trusted system, which data message from the trusted system comprises cryptographic keys, a list of allowed version indicators or manufacturer identifiers, or other information allowing the processor 5 to verify the custom (and/or firmware) program code 411.

In an embodiment, the firmware program code 42 is further configured such that the processor 5 determines the custom program code 411 for the custom application 41 (and/or the firmware program code) in the data container content, before the processor 5 stores the custom (and/or firmware) program code 411 in the memory 4 of the secure element 3. This allows the processor 5 to check whether the data container content contains custom program code (and/or firmware) program code 411 that has been validated, whose identity has been established, or which does not contain malware. This identity can be established by one or more of: generating a hash of the data container content and/or the custom (and/or firmware) program code 411, verifying a signature contained in the data container content, or matching an identifier in the data container content.

In an embodiment, the firmware program code 42 is configured to control the processor 5 to determine in the received data custom application data 412 for the custom application 41, and to store the custom application data 412 in the memory 4 of the secure element 3, the custom application data 412 comprising at least one of a cryptographic key, a cryptographic certificate, an access control black list, or an access control white list for the custom application 41. Storing the access control black list or the access control white list in the memory 4 of the secure element 3 allows the electronic device 1 to perform access authorization as explained below in more detail in the description of FIG. 4.

In an embodiment wherein the electronic (radio) communication circuit 6 comprises a processor 60 and memory 61, the firmware program code 42 is configured to determine whether the data container content comprises program code configured for controlling the electronic (radio) communication circuit 6. Such program code is, for example, firmware, and therefore the secure element 3 is configured to securely update firmware of the electronic (radio) communication circuit 6.

In an embodiment wherein the electronic (radio) communication circuit 6 comprises a processor 60 and memory 61, the firmware program code 42 is further configured to control the processor 5 of the secure element 3 to determine in the received data further program code 411 for the electronic (radio) communication circuit 6, and is configured to store the further program code 411 in the memory 61 of the electronic (radio) communication circuit 6.

In an embodiment the firmware program code 42 is further configured to control the processor 5 of the secure element 3 to determine in the received data further program code 411 for the external processor 7, and to transfer the further program code 411 to the external processor 7. The further program code is transmitted to the external processor via conductor paths of a printed circuit board, a wire connection of an electronic interface circuit, and/or an antenna 8 of an electronic radio communication circuit, depending on the embodiment.

In an embodiment, the data container content comprises a plurality of different modules of the custom program code 411. Each module is associated with a custom code type identifier, and the firmware program code 42 is further configured to control the processor 5 to determine in the data container content different modules of the custom program code 411, and to store the different modules of the custom program code 411 in different memories, depending on the custom code type identifier. The different memories can refer to logical segments or parts of the memory 4 of the secure element 3, a memory 61 of the electronic (radio) communication circuit 6, or a memory of an external processor 7, separate from the integrated circuit 2. The secure element 3 therefore distributes the different modules of the custom program code 411 between different memories according to the custom code type identifier.

In an embodiment, a cryptographic key stored in the memory 4 is replaced with a custom cryptographic key received in the data container content. This allows one or more cryptographic keys to be renewed, updated, or exchanged with a custom cryptographic key. Scheduled updating of cryptographic keys can be an important element in ensuring the security of the electronic device 1 over time. Further, in those embodiments where the electronic device 1 is part of a larger system, during system implementation, commissioning, or updating, the electronic device 1 may be required to have, stored in the memory 4 of the secure element 3, the custom cryptographic key. In order to replace the cryptographic key, the firmware program code 42 is configured to control the processor 5 to determine in the data container content the custom cryptographic key, and to store the custom cryptographic key in the memory 4 of the secure element 3. The previously stored cryptographic key is deleted from memory 4.

In a step S0 (not shown), the data package is prepared in a computer system. The computer system comprises one or more processors and storage, and in an embodiment is a cloud computing system accessed via a web application. The computer system contains a digital twin of one or more electronic devices 1, meaning that the computer system contains one or more virtual electronic devices 1 which are assigned to real-world electronic devices 1 and contain information related to the assigned real-world electronic devices 1. For example, the digital twin of a particular electronic device 1 contains information related to the custom application 41 stored on that particular electronic device 1, e.g. a copy of the custom program code, an identifier of the custom program code, and/or a version number or release date of the custom program code. The computer system is used to encrypt the data package. In particular, the computer system uses symmetric encryption to encrypt the data package using a cryptographic key, which cryptographic key is also stored in the memory 4 of the electronic device 1. The computer system then transmits the encrypted data package to the electronic device 1, either directly via the Internet via a wired connection and/or a wireless network, or via a mobile device which receives the data package and then forwards the data package to the electronic device 1 when the mobile device is within range of the electronic radio communication circuit 6 of the electronic device 1.

Figure 3:
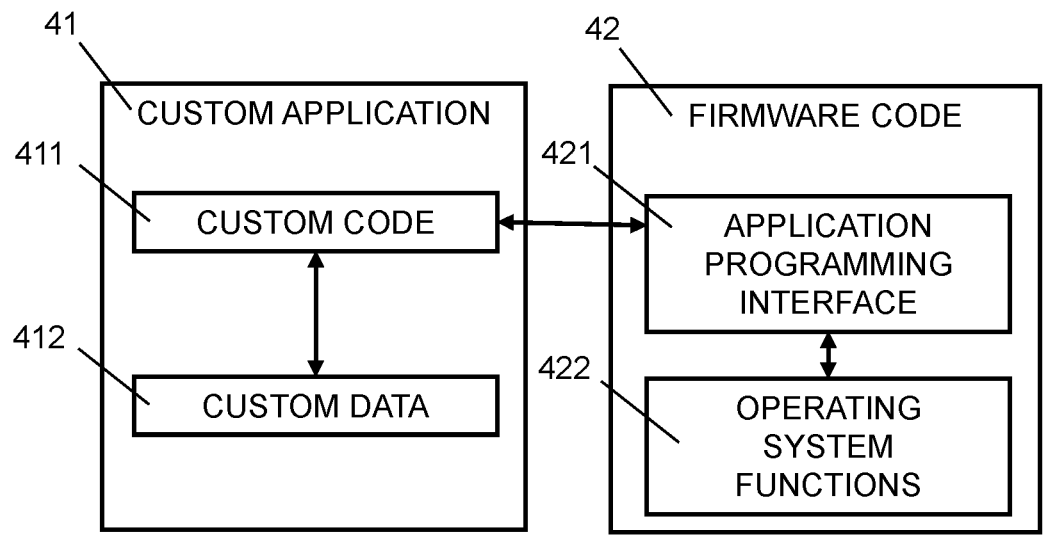
FIG. 3 shows a block diagram illustrating the functional relationship between the custom application and the firmware program code.

FIG. 3 shows a block diagram illustrating the functional relationship between the custom application 41 and the firmware program code 42. In particular, the custom program code 411 calls operating system functions 422 of the firmware program code 42 using the application programming interface 421. Along with the operating system function 422 that the custom program code 411 calls using the application programming interface 421, the custom program code 411 further provides one or more function input parameters when calling the operating system function 422. The custom application 41, or more precisely the custom program code 411, depending on the called operating system function 422, receives a function output parameter, upon execution of the called operating system function 422. The application programming interface 421 provides an extra layer of security such that not all operating system functions 422, or all function input parameters, are called or passed, respectively. The custom application 41 also stores custom program data 412, which is stored, modified, deleted according to the custom program code 411.

By storing the custom application 41 on the memory 4 of the secure element 3, greater security is provided. Further, by segregating the memory 4 into partitions such that the firmware program code 42 and the custom application 41 are stored separately, security and reliability is enhanced.

Figure 4:
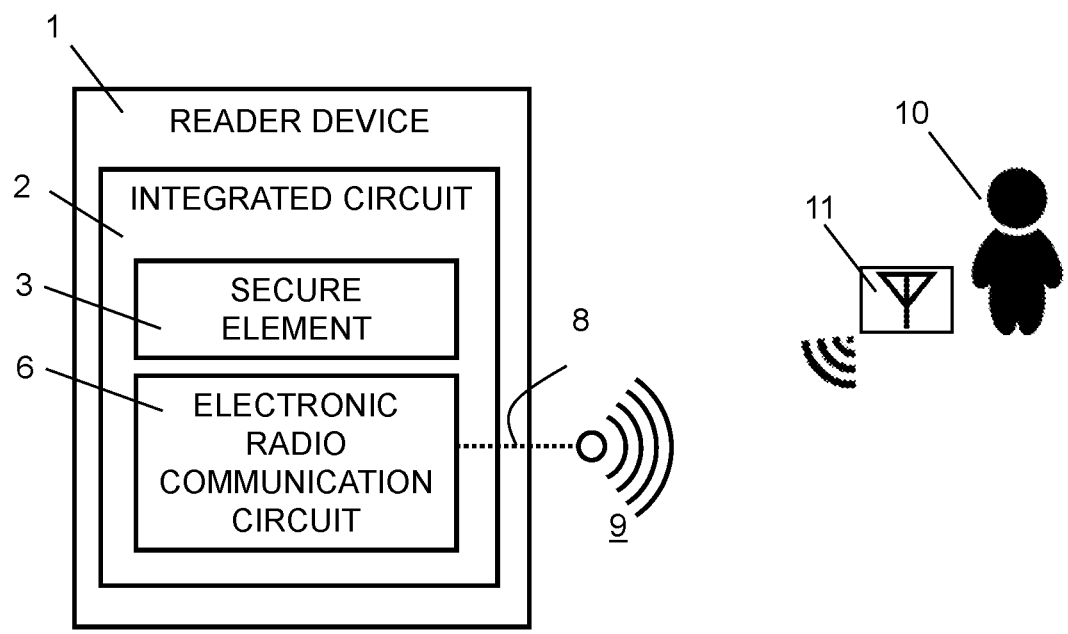
FIG. 4 shows a block diagram illustrating schematically an embodiment where the electronic device is a reader device.

FIG. 4 shows a block diagram illustrating schematically an embodiment where the electronic device is a reader device 1 installed at an access control point, for example a physical access control point such as a doorway, gate, entryway or other access point to a physical location. Alternatively, the reader device 1 is installed at or in a computer terminal or other electronic terminal and governs access control to a virtual resource, such as a website, computer program, server, or the like. A user 10 is possession of a user device 11. The user device 11 is a mobile phone, key card, dongle, tag, or other mobile electronic device configured for wireless communication with the reader device 1. The reader device 1 performs access authorization by receiving, from the user device 11, an access request. The access request includes access credentials comprising an identifier of the user or the user device, a cryptographic key, or a cryptographically signed message. The access request including the access credentials are received in the electronic radio communication circuit 6 and then obtained by the secure element 3. The custom program code 411 of the custom application 41 is configured to control the processor 5 of the secure element 3 to determine access authorization by calling an operating system function 422 using the application programming interface 421 and having as input parameters the access credentials, and data stored in the custom program data 412. For example, the processor 5 determines access authorization using the access credentials and the access control black list or the access control white list. The custom application 41 is configured to receive as an output parameter of the called operating system function 422 either a positive or a negative access authorization, upon which the custom application 41 is configured to control the processor 5 to transmit a message to the electronic radio communication circuit 6, additional internal hardware components of the reader device 1, and/or additional external hardware components communicatively connected to the reader device 1, depending on the embodiment. The message confirms or denies access authorization. In an embodiment, contingent on access authorization confirmation, an actuator of the doorway or gate is controlled to grant access to the user 10.

The invention claimed is:

1. An electronic device including an integrated circuit, the integrated circuit comprising at least one electronic communication circuit and a secure element electronic circuit including a processor and memory, the processor of the secure element electronic circuit being connected to the at least one electronic communication circuit and to the memory of the secure element electronic circuit, the memory of the secure element electronic circuit having stored therein firmware program code configured to control the processor of the secure element electronic circuit to implement operating system functions, the operating system functions including a data receiving function, obtaining received data from the electronic communication circuit, and a data transmitting function, writing data to be transmitted to the electronic communication circuit, wherein the firmware program code of the secure element electronic circuit is further configured to control the processor of the secure element electronic circuit to determine in the received data, obtained by the data receiving function of the secure element electronic circuit from the electronic communication circuit, custom program code for a custom application, and to store the custom program code in the memory of the secure element electronic circuit, and to control the processor of the secure element electronic circuit to implement an application programming interface configured to receive from the custom application, upon execution of the custom program code on the processor of the secure element electronic circuit, requests for operating system functions, and to execute the requested operating system functions for the custom application on the processor of the secure element electronic circuit.

2. The electronic device of claim 1, wherein the firmware program code is further configured to control the processor of the secure element electronic circuit to determine, in the received data, encrypted custom program code for the custom application, and to decrypt the encrypted custom program code, prior to storing the custom program code in the memory of the secure element electronic circuit, using a cryptographic key stored in the memory of the secure element electronic circuit.

3. The electronic device of claim 1, wherein the firmware program code is further configured to control the processor of the secure element electronic circuit to determine in the received data an encrypted data container, to determine a data container content by decrypting the encrypted data container, using a cryptographic key stored in the memory of the secure element electronic circuit, and to store at least some data of the data container content in the memory of the secure element electronic circuit.

4. The electronic device of claim 3, wherein the firmware program code is further configured to determine the custom program code for the custom application in the data container content, prior to storing the custom application code in the memory of the secure element electronic circuit.

5. The electronic device of claim 4, wherein the firmware program code is further configured to determine in, the data container content, different modules of the custom program code, each module being associated with a custom code type identifier, and to store the different modules of the custom program code in different memories, depending on the custom code type identifier, whereby the different memories include at least one of: a memory section of the memory of the secure element electronic circuit, a memory of the electronic communication circuit, or a memory of an external processor, separate from the integrated circuit.

6. The electronic device of claim 3, wherein the firmware program code is further configured to determine in the data container content a custom cryptographic key, and to store the custom cryptographic key in the memory of the secure element electronic circuit as a replacement of the cryptographic key stored previously in the memory of the secure element electronic circuit.

7. The electronic device of claim 1, wherein the firmware program code is further configured to control the processor of the secure element electronic circuit to verify in the custom program code at least one of: a version indicator, a manufacturer identifier, or a cryptographic signature, prior to storing the custom program code in the memory of the secure element electronic circuit.

8. The electronic device of claim 1, wherein the firmware program code is further configured to control the processor of the secure element electronic circuit to implement operating system functions further including one or more cryptographic functions, the one or more cryptographic functions comprising at least one of: an encryption function, a decryption function, a hash function, a cryptographic key generating function, a cryptographic key deletion function, a cryptographic signing function, or a cryptographic signature verification function.

9. The electronic device of claim 1, wherein the firmware program code is further configured to control the processor of the secure element electronic circuit to implement operating system functions further including a random generator function.

10. The electronic device of claim 1, wherein the firmware program code is further configured to control the processor of the secure element electronic circuit to implement operating system functions further including a cyclic redundancy check function.

11. The electronic device of claim 1, wherein the firmware program code is further configured to control the processor of the secure element electronic circuit to determine, in the received data, custom application data for the custom application, and to store the custom application data in the memory of the secure element electronic circuit, the custom application data comprising at least one of: a cryptographic key, a cryptographic certificate, an access control black list, or an access control white list for the custom application.

12. The electronic device of claim 1, wherein the firmware program code is further configured to control the processor to implement the application programming interface further configured to receive from the custom application, upon execution of the custom program code on the processor of the secure element electronic circuit, a function input parameter with a request for an operating system function, and to return to the custom application a function output parameter, upon execution of the requested operating system function.

13. The electronic device of claim 1, wherein the electronic communication circuit comprises a processor and memory, and wherein the firmware program code is further configured to control the processor of the secure element electronic circuit to determine in the received data further program code for the electronic communication circuit, and to store the further program code in the memory of the electronic communication circuit.

14. The electronic device of claim 1, wherein the firmware program code is further configured to control the processor of the secure element electronic circuit to determine in the received data further program code for an external processor, separate from the integrated circuit, and to transfer the further program code to the external processor.

15. The electronic device of claim 14, wherein the firmware program code is further configured to control the processor of the secure element electronic circuit to transfer the further program code to the external processor via at least one of: conductor paths of a printed circuit board, a wire connection of an electronic interface circuit, or an antenna of an electronic radio communication circuit.

16. The electronic device of claim 1, wherein the electronic communication circuit further comprises an electronic interface circuit configured to exchange data with an external device via a wire connection.

17. The electronic device of claim 1, wherein the electronic communication circuit is configured to exchange data with an external device via a wireless connection.

18. The electronic device of claim 1, wherein the secure element electronic circuit further comprises a memory management unit configured to maintain a plurality of memory address spaces in the memory and to assign, to the custom application and the firmware program code, separate memory address spaces, such that the custom application code does not have access to the memory address space of the firmware program code.

19. An electronic device including an integrated circuit, the integrated circuit comprising at least one electronic communication circuit and a secure element electronic circuit including a processor and memory, the processor of the secure element electronic circuit being connected to the at least one electronic communication circuit and to the memory of the secure element electronic circuit, the memory of the secure element electronic circuit having stored therein firmware program code configured to control the processor of the secure element electronic circuit to implement operating system functions, the operating system functions including a data receiving function, obtaining received data from the electronic communication circuit, and a data transmitting function, writing data to be transmitted to the electronic communication circuit,
wherein the firmware program code is further configured to control the processor of the secure element electronic circuit to determine in the received data an encrypted data container, to determine a data container content by decrypting the encrypted data container, using a cryptographic key stored in the memory of the secure element electronic circuit, to determine, in the data container content, different modules of custom program code for a custom application, each module being associated with a custom code type identifier, and to store the different modules of the custom program code in different memories, depending on the custom code type identifier, whereby the different memories include at least one of:
a memory section of the memory of the secure element electronic circuit, a memory of the electronic communication circuit, or a memory of an external processor, separate from the integrated circuit, and
to control the processor to implement an application programming interface configured to receive from the custom application, upon execution of the custom program code on the processor of the secure element electronic circuit, requests for operating system functions, and to execute the requested operating system functions for the custom application.

20. An electronic device including an integrated circuit, the integrated circuit comprising at least one electronic communication circuit and a secure element electronic circuit including a processor and memory, the processor of the secure element electronic circuit being connected to the at least one electronic communication circuit and to the memory of the secure element electronic circuit, the memory of the secure element electronic circuit having stored therein firmware program code configured to control the processor of the secure element electronic circuit to implement operating system functions, the operating system functions including a data receiving function, obtaining received data from the electronic communication circuit, and a data transmitting function, writing data to be transmitted to the electronic communication circuit, wherein the firmware program code is further configured to control the processor of the secure element electronic circuit to determine, in the received data, different modules of custom program code for a custom application, each module being associated with a custom code type identifier, and to store the different modules of the custom program code in different memories, depending on the custom code type identifier, whereby the different memories include at least one of: a memory section of the memory of the secure element electronic circuit, a memory of the electronic communication circuit, or a memory of an external processor, separate from the integrated circuit, and to control the processor to implement an application programming interface configured to receive from the custom application, upon execution of the custom program code on the processor of the secure element electronic circuit, requests for operating system functions, and to execute the requested operating system functions for the custom application.

* * * * *